United States Patent [19]

Hayward

[11] Patent Number: 4,630,029
[45] Date of Patent: Dec. 16, 1986

[54] DISPLAY SYSTEMS

[76] Inventor: Walter Hayward, 1805 Ponderosa Pl., Loveland, Colo. 80537

[21] Appl. No.: 693,020

[22] Filed: Jan. 22, 1985

[51] Int. Cl.⁴ ............................................. B60Q 1/00
[52] U.S. Cl. ..................... 340/87; 296/218; 340/84
[58] Field of Search .................. 340/87, 74, 88, 89, 340/93, 135, 146, 52 R, 84; 40/591, 592, 593, 618, 619; 296/211, 218; 307/10 LS; 362/61

[56] References Cited

U.S. PATENT DOCUMENTS

| | | | |
|---|---|---|---|
| 2,918,566 | 12/1959 | Lunsford | 340/87 X |
| 4,081,788 | 3/1978 | Gaspar | 340/87 X |
| 4,186,525 | 2/1980 | Caralho | 296/218 |

Primary Examiner—Glen R. Swann, III
Assistant Examiner—Jeffery A. Hofsass
Attorney, Agent, or Firm—Hugh H. Drake

[57] ABSTRACT

An opening is formed into the generally flat roof of a vehicle, and a hollow frame matches to the top of that opening. Overlying the frame is a generally flat panel of matching size and shape therewith, with the panel being hingedly secured along one edge to the corresponding portion of the frame. An adjustable connection exists between another portion of the panel and the frame to swing the panel between a first position in which the panel is latched, enclosing the opening, and a second position in which the panel is tilted upwardly away from the roof. At least one or two display devices are in the form of a comparatively shallow box which may lie with a major surface substantially against the upper surface of the panel so as to visually present a shallow profile. The device is hinged at one margin to the panel, and the panel carries a handle operable from within the interior of the vehicle for swinging the device between storage and upright positions. Included on the panel are a partially encircling rib for concealment purposes, a ridge for combatting freezing conditions and various other details which may be desirable.

6 Claims, 6 Drawing Figures

DISPLAY SYSTEMS

The present invention pertains to display systems. More particularly, it relates to displays which may be mounted on top of the roof of a vehicle.

Informational displays mounted atop a vehicle have long been known. One of the more familiar announces that the vehicle is a taxi. Others have carried advertising or warnings. Flashing-type warning or emergency lights are commonly observed atop vehicles operated by those providing police, fire, medical, public utility and other services.

For many such services, it is satisfactory to have such devices permanently mounted to the roof top. Because of a need for comparatively frequent replacement, as in the case of police departments, a conventional installation has been a securely-attachable light bar on which flashing lights and other apparatus, such as loudspeakers, are mounted. Frequently, an agency such as a police department desires a semi-permanent installation of visable emergency lights, because it is desired to keep the driving public informed that patrol cars are in the vicinity.

Nevertheless, there are times when an agency, such as a law-enforcement department, desires to conceal any emergency lights while "prowling" or conducting surveillance. Yet it is desired to have a flashing-light system available when emergency action has to be taken, such as higher-speed driving or during apprehension of someone being sought. Similarly, there are situations involving other types of vehicles, wherein a display or warning system needs to be retracted or otherwise "concealed" from exposure to the elements at times when not needed.

The immediate foregoing has led to a variety of suggestions for retractable emergency lights. Representative prior art will be observed in U.S. Pat. Nos. 2,918,566—Lunsford, 3,579,184—Forestal, 3,761,890—Fritts et al, 4,081,788—Gaspar and 4,259,660—Oliver.

In some cases, such as in Fritts et al, the purpose of retractability of a display system is not for concealment of the purpose of the vehicle, but to avoid exessive wind drag on the vehicle when the display is erected. At the same time, retraction protects the device against the effects of pitting from blown sand and the like as well as contamination with insects upon the face of the display while driving.

As heretofore unrelated development in automotive vehicles is the development of the sun roof which usually takes the form of an opening in what otherwise would be the regular roof of the vehicle and closeable to secure the weatherproof integrity of the roof. At the same time, the panel may be swung to an open position in order to allow the entry of fresh air into the interior of the vehicles, as well as, in some arrangements, to allow visibility out of the roof. The sun roof may allow more comfortable interior ventilation in the absence of or without requiring the use of any air conditioning apparatus installed in the vehicle, if for no reason other than the economy of operation. Also, the person driving the vehicle may not even want to use air conditioning, because he finds it desirable to leave his side windows opened for the purpose of being able to hear exterior sound.

A general object of the present invention is to provide a new and improved display system which has a capability of obtaining the benefits of retractable displays as discussed above.

Another object of the present invention is to provide a new and improved display system which is facilitates easy installation into a semi-permanent mode and yet which is readily retrievable and replaceable when it is desired to move it from one vehicle unit to another.

A further object of the present invention is to provide a new and improved display device of the foregoing character which is capable of being operated in conditions of inclement weather.

Thus, the present invention is for use on a vehicle having a generally flat roof and in which is defined an opening through the roof into the interior of the vehicle. In accordance with one embodiment thereof, a hollow frame is of a size and shape to match the wall of the opening and is mountable to that wall around the opening. A generally-flat panel has a size and shape which matches the size and shape of the frame, so as to overlie the frame and close the opening. A panel is hingedly secured to a matching portion of the frame, while an adjustable connection between another portion of the panel and another portion of the frame is operable to swing the panel between a first position, in which the panel is latched in closure of the opening, and a second position in which the panel is tilted upwardly away from the roof. There is at least one display device which has a length and with substantially larger than its thickness and is positionable to lie with a major surface substantially against the upper surface of the panel in order to visually present a shallow profile above the panel. A margin of the device is hingedly coupled to the upper surface of the panel, and means carried by the panel and operable from within the interior of the vehicle is used for swinging the device between a first position lying atop the panel and a second position in which the device stands upright on the panel.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
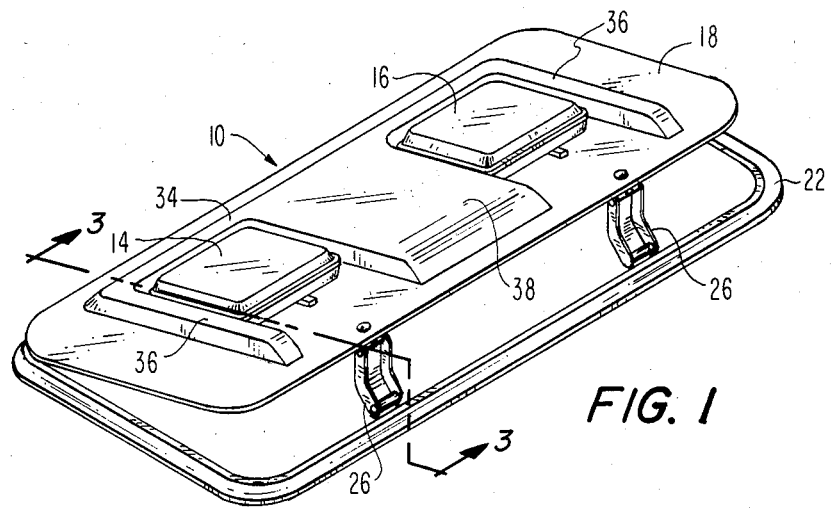
FIG. 1 is an isometric view of an embodiment of a display system.
Figure 2:
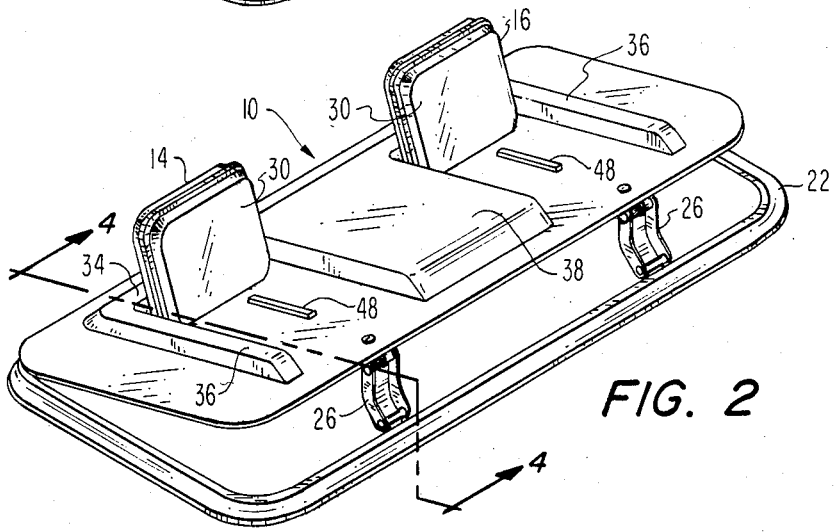
FIG. 2 is a view similar to FIG. 1, but with certain components in a different position.

A display system 10 is mounted atop the roof 12 or similar horizontal surface of a vehicle which may be an automotive-type passenger car, the cab of a truck or a suitable mounting surface on any other kind of vehicle. For purposes of illustration, display system 10 includes a displaced pair of bright light sources 14 and 16 located atop a panel 18 which is situated on the roof.

In this specific embodiment, merely an illustration of the basic combination, each of light sources 14 and 16 includes a colored, transparent cabinet and the system is designed for use by law enforcement agencies. It has been reported that those agencies often prefer a combination of flashing blue and red lights, so as to increase perception by the human eye of the lights under varying conditions of external ambient light. At least some law enforcement departments also prefer the inclusion of a flashing white light in the combination of flashing lights, and the approach described is fully adaptable to the inclusion of a third or even more respectively different light sources. Moreover, it is to be remembered that the objectives of the improved structure extend to implementations other than the requirements of law enforcement agencies.

The roof is provided with an opening 20 defined by a wall peripherially formed into the roof. In many cases, such an opening may be acquired with the vehicle as original equipment or as an option to that purchase. If not already present, it may be readily added to the roof of most vehicles, by locating it between cross-bracing members under the roof.

Seated within or around opening 20 is a hollow frame 22 which is of a size and shape to match the wall of opening 20, and it is mountable to that wall around the opening. This may be the same frame provided with the vehicle to hold a sun roof and as adapted to the present embodiment. Or it may be a replacement therefor.

Panel 18, as indicated, has a size and shape which matches the size and shape of frame 22 and is positionable so as to overlie frame 22 and close opening 20. In retrofitting an existing installation of a sun roof, panel 18 preferably is a substitute for the original panel.

Figure 3:
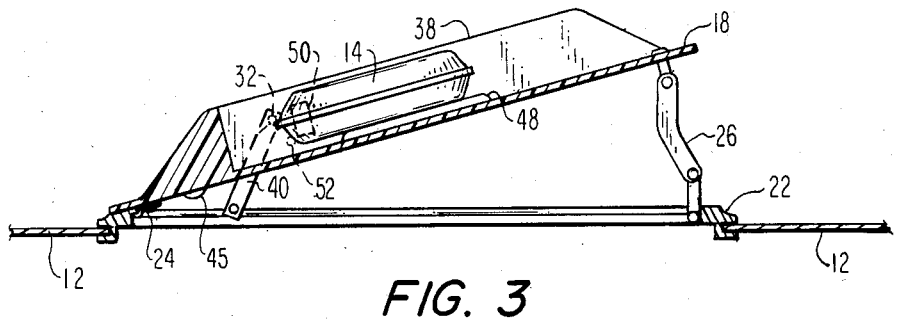
FIG. 3 is a cross-sectional view taken along the line 3—3 in FIG. 1 and also showing a supporting structure.
Figure 4:
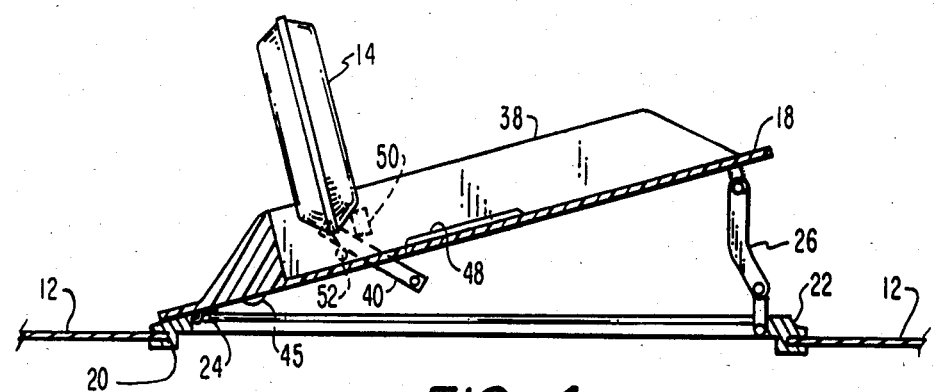
FIG. 4 is a cross-sectional view taken along the line 4—4 in FIG. 2.

A pair of hinges 24 along the front margin of panel 20 secure that edge portion of the panel to a matching portion of frame 22. Hinges 24 in this case are simply mounted by slipping a finger projecting therefrom into a groove formed in the inner wall of frame 22 as shown in FIGS. 3 and 4. Connecting the rear margin of panel 20 to frame 22 are a pair of laterally-spaced-apart finger-operated toggles 26. Toggles 26 enable an operator inside the vehicle to swing panel 18 about hinges 24 between a first position in which panel 18 is latched in closure of opening 20 and a second position in which panel 18 is tilted upwardly away from roof 12. In an alternative, one or more toggles 26 may be located on the end margins of panel 18. Moreover, the toggles may be replaced by a motor-driven device to power the opening and closure movements under the control of a simple switch. A linear motor, such as a solenoid, could easily accomplish that function, although it is not believed to be necessary to encounter that expense.

Each of light sources 14 and 16 preferably is in the form of a plastic transparent cabinet which has a length and width substantially larger than its thickness. It is positional to lie with a rear-facing major surface 30 substantially against the upper surface of panel 18, so as to visually present a shallow profile above panel 18 and likewise above roof 12. Each of light sources 14 and 16 is coupled by a respective hinge 32 along its rear margin to the upper surface of panel 18.

Specifically in this case, hinges 32 are mounted to a forwardly-facing rib 34 that projects upwardly from the upper surface of panel 18. The outer ends of each hinge 32 that directly connects to the two light sources 14 and 16 is supported by a rearwardly-turned portion 36 of rib 34. Also continuing rearwardly from the central portion of rib 34 is a housing 38 the side walls of which support the inner ends of hinges 32. Rib 34 and housing 38 are integrally molded into the top of panel 18 that may be formed of any rigid material such as fiberglass, a plastic or a metallic sheet.

The inner ends of hinges 32 are connected to a handle 40 exposed on the underside of panel 18, so as to be operable from the interior of the vehicle in order to swing each of light sources 14 and 16 between a first position lying atop panel 18 and a second position in which each of the sources stands upright on panel 18. This is preferred as the simplest approach. Of course, motorization could be used for that movement of light sources 14 and 16.

Figure 5:
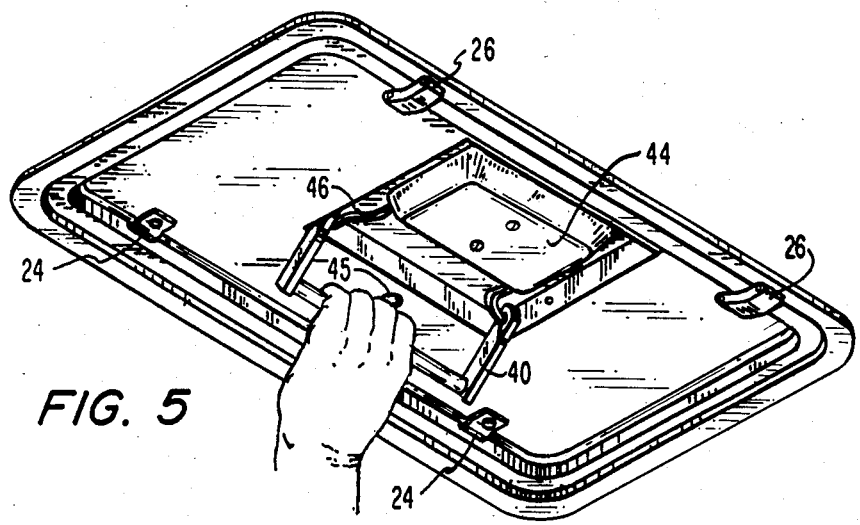
FIG. 5 is a fragmentary operational view of the underside of that shown in FIG. 1A.
Figure 1A:
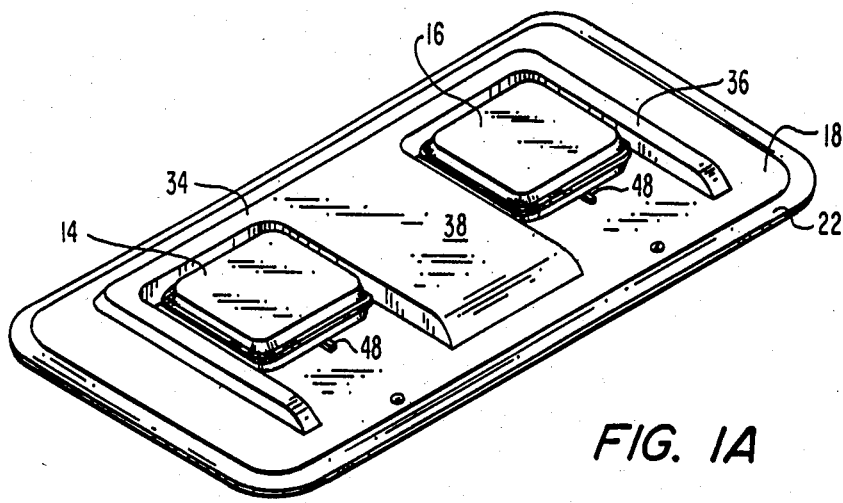
FIG. 1A is a view similar to FIG. 1 but with components differently positioned.

Housing 38 need not protrude upwardly from panel 18 as illustrated. However, it represents a preferred and convenient manner of mounting hinges 32, and it provides an interior recess for mounting the electrical system which operates the lights. As seen in FIG. 5, an enclosure 44 houses that electrical system. An indicator light 45 is mounted to show through the undersurface of panel 18 and is energized when the lights are elevated and flashing.

Suitable wiring 46 leads from enclosure 44 through the interiors of hinges 32 to the respective ones of light sources 14 and 16. The electrical system may be very conventional. At least two of the circuits shown in the references mentioned in the introduction incorporate the facility of causing the flashing of indicators in sequence or otherwise. Flashing units are readily available in the marketplace for effecting alternative operation of a plurality of light sources; indeed, one flashing unit is available which is about the same size as the ordinary turn signal flasher but which in its original use caused alternation of the flashing of the head lights of a vehicle. However, an electronic system is preferred in order to lower electrical current consumption.

At the same time, however, it may be desirable to produce a much greater intensity of illumination from light sources 14 and 16. This is typically achieved with a strobe-light approach that employs a capacitively-stored discharge of energy sequentially into a light source. Enclosure 44 is of sufficient size to readily accept conventional strobe-light systems already in widespread use for emergency vehicles.

It will be noted that rib 34 and its rearwardly turned portions 36 are located near the margin of panel 18 on the front and two sides thereof. The height of rib 34 is selected to be sufficient to conceal light sources 14 and 16 when they are swung downwardly, thereby to conceal those sources as viewed from a horizontally-related position. Rib 34 desirably is open at the rear to encourage free drainage from the total system of what might otherwise be a collection of precipitation. If desired, however, rib 34 may also be continued across the rear margin of panel 18. In that case, drainage slots preferably would be included.

A ridge or lug 48 preferably protrudes or up-stands away from the upper surface of panel 18 and is in a location to engage rear major surface 30 of each of light sources 14 and 16 as those sources are swung downwardly to their storage positions wherein they are disposed substantially against the upper surface of panel 18. This small lug becomes important in the case of a collection on top of panel 18 of freezing precipitation that might tend to bond light sources 14 and 16 against their being swung upwardly.

As specifically embodied, a switch 50 is mounted on enclosure 44 in a position to be actuated upon movement of handle 40 and thereby effect energization of the electical system. However, a manually-operated switch may be substituted. In addition, indicator light 45 may be mounted on the bottom of enclosure 44 or elsewhere to signal the operator that the light sources are operating.

Although mere friction or detenting in the action of hinges 32 may serve to hold light sources 14 and 16 in their upright or raised postion, a more positive latch is preferred in order to secure that positioning as against the force of wind created by movement of the vehicle or otherwise. As shown, a spring loaded "bullet" catch 52 is mounted on the side wall of enclosure 44 and engages handle 40 for the purpose of latching light sources 14 and 16 when swung to their operative position. However, a later approach uses a simple manual-release catch.

Thus, the specific embodiment enables the obtainment of the attributes of just having a simple sunroof. At the same time, it supports a display structure of whatever nature and which is readily installed and may be removed for transfer to another vehicle. It enables the use of ordinary sunroof construction as may be originally obtained with the vehicle, while at the same time it may be its own unit to be added to a vehicle not originally provided with a sun roof. Even in the latter case, the opening formed in the roof can then be replaced with a standard sun roof for resale of the vehicle.

As noted, the particular number and even the manner of any sequencing may be altered as well as can be the kinds of individual materials or devices employed. On the other hand, the approach has utility even when not combined, as such, with the sunroof concept.

While a particular embodiment of the invention has been shown and described, and various modifications and alternatives have been taught, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. For use on a vehicle having a generally flat roof in which is defined the wall of an opening through the roof into the interior of the vehicle, a display system comprising:

a hollow frame, of a size and shape matching the wall of said opening, mountable to said wall around said opening;

a generally-flat panel having a size and shape matching the size and shape of said frame to overlie said frame and close said opening;

means for hingedly securing one edge portion of said panel to a matching portion of said frame;

adjustable means connecting another portion of said panel to another portion of said frame and operable to swing said panel about said securing means between a first position in which said panel is latched in closure of said opening and a second position in which said panel is tilted upwardly away from said roof;

at least one display device having a length and width substantially larger than its thickness and positionable to lie with a major surface substantially against the upper surface of said panel to visually present a shallow profile above said panel;

means for hingedly coupling one margin of said device to said upper surface of said panel;

and means carried by said panel and operable from within the interior of said vehicle for swinging said display device between a first position lying atop said panel and a second position in which said device stands upright on said panel.

2. A display system as defined in claim 1 which includes an upwardly-projecting rib defined substantially around and spaced near the margin of said panel on at least three sides thereof, the height of said rib being sufficient to conceal said device when swung downwardly and when said system is viewed horizontally from one of said three sides.

3. A display device as defined in claim 1 which includes a lug upstanding from the upper surface of said panel in a location to engage said major surface of said device as said device is swung downwardly to its position substantially against said upper surface of said panel.

4. A display device as defined in claim 1 in which said adjustable means includes a finger-operable toggle for raising and lowering said other portion of said panel.

5. A display device as defined in claim 1 in which said panel includes an integrally-formed housing and in which said housing encloses means for energizing said display device.

6. A display device as defined in claim 5 in which said display device includes a source of light and in which said actuating means includes apparatus for periodically energizing said source of light.

* * * * *